United States Patent [19]
Friedman

[11] 3,900,859
[45] Aug. 19, 1975

[54] APPARATUS AND METHOD FOR OPTICAL ANNOTATION OF ORTHOPHOTOGRAPHS
[75] Inventor: Seymour Jack Friedman, Alexandria, Va.
[73] Assignee: O.M.I. Corporation of America, Alexandria, Va.
[22] Filed: Jan. 15, 1974
[21] Appl. No.: 433,535

[52] U.S. Cl. ............................................. 354/109
[51] Int. Cl. ......................................... G03b 17/24
[58] Field of Search .................. 95/1.1, 4.5; 354/109

[56] References Cited
UNITED STATES PATENTS

| | | | |
|---|---|---|---|
| 2,978,969 | 4/1961 | Heine | 95/4.5 |
| 3,192,828 | 7/1965 | Swanson | 355/52 |
| 3,464,331 | 6/1969 | Tiefenthal | 95/4.5 |
| 3,517,591 | 6/1970 | Cope | 95/4.5 |
| 3,697,176 | 10/1972 | Kuehnle | 355/45 |
| 3,732,796 | 5/1973 | Marcy | 95/12 |

Primary Examiner—John M. Horan
Attorney, Agent, or Firm—Martin P. Hoffman; Donald M. Sandler; James H. Ewing

[57] ABSTRACT

Apparatus employed in conjunction with the optical transmission train of an orthophotographic printer to automatically add graphic data to the orthophotograph, thus producing an orthophotographic map. Such apparatus comprises an indexable turret with a series of apertures formed about its periphery, one transparency of a series of transparencies retained within each aperture of the turret, each transparency bearing the image of a cartographic symbol or bit of alphanumeric data, a light source and a condensing lens for directing the rays of light through the selected transparency, and a mirror for reflecting the image of the symbol on the selected transparency into the optical transmission train of the orthophotographic printer. The mirror is located at an angle to the plane of the optical transmission path and serves the dual function of (1) permitting the image of a selected portion of an aerial photograph to be projected therethrough, and/or (2) reflecting the image on the illuminated transparency downwardly through the optical transmission train in the same fashion as a reflex lens system. The mirror may be either semi-reflecting or fully reflecting; in the latter instance, a solenoid controls the pivotal movement of the mirror in to, and out of, the path of the optical transmission train. By virtue of such arrangements, the recording film is exposed to receive a distortion free aerial photograph, or orthophotograph, and appropriate symbols for annotating the orthophotograph.

The related techniques for optically annotating the orthophotograph in an on-line procedure represent a significant improvement over conventional manual off-line annotating procedures.

3 Claims, 5 Drawing Figures

APPARATUS AND METHOD FOR OPTICAL ANNOTATION OF ORTHOPHOTOGRAPHS

BACKGROUND OF THE INVENTION

1. Field of the Invention

This invention relates generally to the production of orthophotographs from aerial photographs with their inherent distortions, and more particularly to the production by optical techniques of fully annotated orthophotographs, such as orthophotographic maps.

2. Prior Art

An aerial photograph can be a very valuable substitute for a map, for a photograph is more realistic and can capture details at a particular instant in time, such as color, shading, topography, etc. that cannot be duplicated by the stylized recreations of the cartographer. However, the potential superiority of aerial photographs vis-a-vis maps has not been realized in practice because the aerial photographs have lacked (1) the geometric accuracy of the maps, as well as (2) the informative annotations, such as names of places, coordinates of points, classes of roads, bridge locations, boundary lines, etc., that are provided by maps.

The lack of geometric accuracy in aerial photographs is attributable to distortions introduced by the (a) perspective view of the earth through the lens of the camera mounted in the airplane, (b) tilt of the camera with respect to the true datum plane, (c) curvature of the earth, (d) lens distortion, (e) film shrinkage, and (f) sundry other factors. In order to correct these distortions and to produce an orthophotograph that approximates a photograph taken at infinity by a camera receiving only parallel rays of light, three varieties of orthophotographic printers with distinct operational characteristics have been utilized.

The simplest and most common orthophotographic printer employs elaborate mechanical linkages and analogue techniques to orient an aerial photograph in a position corresponding to the camera position at the instant the photograph was taken. The photograph is illuminated by a light source and the image captured thereon is projected onto a film platen by a fixed wide-angle lens system. The platen is vertically adjustable, and a mask with a narrow exposure slit is movable across the film platen. The operator observes a stereographic pair of photographs and continually adjusts the height of the film platen to maintain the exposure slit in contact with the surface of the stereographic image produced by the overlapping portion of the pair of photographs. One commercially available orthophotographic printer of this type is the Bean Orthophotoscope.

A second variety of orthophotographic printer, or orthoprinter, is the electronic orthophotographic generator which is predicated upon analytical principles and employs two image scanners to produce video signals from overlapping areas of a pair of aerial photographs, and video correlation techniques to sense the surface of the terrain being photographed. The orthographic transformation is achieved by scanning the aerial photograph in its particular coordinate system, and then re-displaying the resulting video information in an orthogonal output coordinate system. The video signal generator is a flying-spot scanner, and cathode-ray tubes and photomultiplier tubes, as well as a video-processor, are operatively associated with the scanner to produce an orthophotograph.

A third variety of orthoprinter is the direct-optical orthophotographic printer which is predicated upon analytical principles and employs a first carriage for the aerial photograph and a second carriage for the sensitized recording film that will be transformed into an orthophotograph; the two carriages are parallel to one another and are independently movable in X and Y planes past a stationary optical transmission train in response to commands from a computer operatively associated with the orthophotographic printer. The optical transmission train includes a light source, a condenser, and a rotatable scanning slit on one side of the aerial photograph supported on a first photocarriage, and a zoom lens, exposure control shutter, a prism, and an exposure mask with a fixed slit interposed between the first and second carriages. Transformation of the aerial photograph is achieved by moving the first carriage past the optical axis of the optical transmission train, varying the rotation of the scanning slit and the magnification of the optical system according to the orientation of the aerial photograph and the relief of the terrain, counter-rotating the image to cancel the previous rotation of the scanning slit, and then exposing the output image through the mask onto a selected area of the sensitized record film. The recording film is moved relative to the fixed exposure mask in the X and Y planes.

The three varieties of orthophotographic printers, or orthoprinters, are described in greater detail in an article entitled "Orthophoto Generation", by J. J. Edmond, which appears at pages 32–43 of the Bendix Technical Journal for Summer, 1968. Additional details of one embodiment of the direct-optical orthophotographic printer are shown in U.S. Pat. No. 3,446,553, granted to Lino-Somazzi on May 27, 1969; note particularly FIGS. 2 and 3.

While all three varieties of orthophotographic printers have overcome the problem of obtaining the same geometrical accuracy from an aerial photograph as from a map with varying degrees of success and with divergent costs, no orthophotographic printer to date has been able to automatically annotate the orthophotograph in an on-line procedure. Current practice calls for a draftsman to manually draw the desired cartographic and/or alphanumeric symbols on the orthophotograph in a painstaking and tedious manner that is incompatible with the high speed processing capabilities of the orthophotographic printer and its associated computational hardware. Thus, the annotated orthophotograph has not gained acceptance as a map substitute, nor has the annotated orthophotograph gained its deserved acceptance as a detailed and accurate pictorial tool that is far superior to the conventional stylized map.

SUMMARY OF THE INVENTION

Thus, with the inability of known orthophotographic printers to annotate orthophotographs in an on-line procedure, the instant invention contemplates optical apparatus that will automatically annotate an orthophotograph as such orthophotograph is produced on the recording film. Additionally, such optical apparatus is theoretically compatible with all known orthoprinters, although it is ideally suited for use with the optical transmission train of the direct-optical orthophotographic printer and takes full advance of the capabilities of such transmission train. The procedure for utilizing such optical apparatus lends itself to either computer or manual commands, and represents a marked advance over known manual annotating techniques.

Further advantages and improvements will become readily skilled to the technician versed in the field of orthophotography, when the ensuing description of the instant invention is construed in harmony with the appended drawings.

DESCRIPTION OF PREFERRED EMBODIMENT

Figure 1:
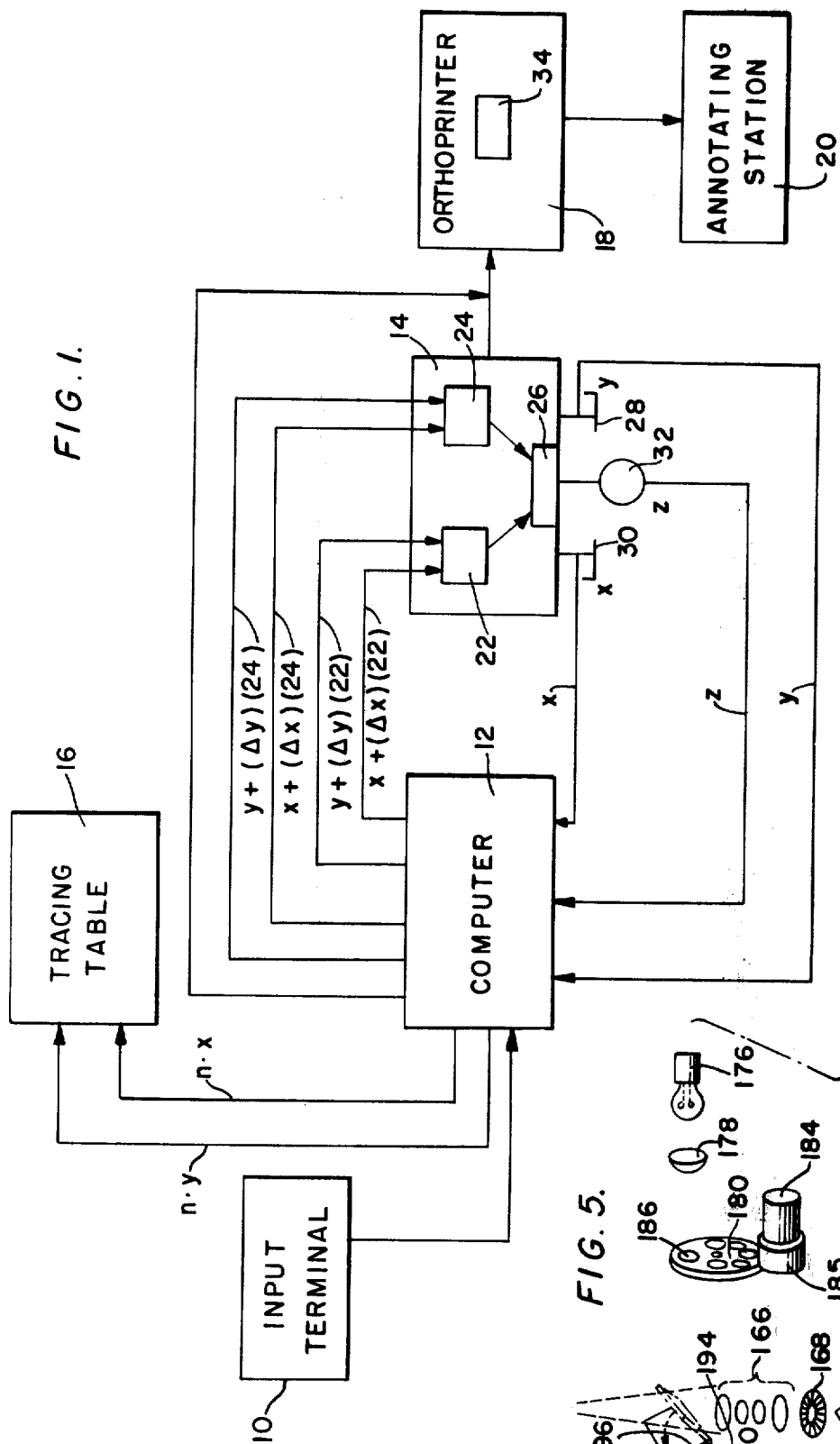
FIG. 1 is a schematic diagram of a known system for producing annotated orthophotographs, such diagram showing the functional interrelationships between a computer, stereocomparator, tracing table orthophotgraphic printer and annotating station.

Referring now to the drawing, FIG. 1 schematically represents a known system for producing an annotated orthophotograph. The system includes an input terminal 10 which feeds information into the storage facility of a computer 12, a stereocomparator or viewer 14, a tracing table 16, an orthophotographic printer 18, also known as an orthoprinter, and an annotating station 20.

The stereocomparator 14 may assume serveral forms, but the stereocomparator described in U.S. Pat. No. 3,116,555, granted Jan. 7, 1964, to U. V. Helava, is probably the instrument best suited for usage within the system of FIG. 1. The stereocomparator 14 includes a first photocarriage 22 for supporting a first aerial photograph, and a second photocarriage 24 for supporting a second aerial photograph of a series of aerial photographs. The photocarriages are independently movable so that the overlapping portions of the aerial photographs produce a three dimensional stereoscopic image that is visible through binocular viewer 26. The photocarriages are moved in the X and Y planes by manipulation of handwheels 28 and 30, and a footwheel 32 is manually adjusted by the operator so that the height of the stereoscopic image in the Z plane relative to a datum plane, such as sea level, is given due consideration.

The adjustments of handwheels 28 and 30, and footwheel 32, produce input signals that are fed into computer 12 as indicated by the three lead lines designated $x$, $y$ and $z$, respectively, in FIG. 1. Computer 12 processes the information that has already been inserted therein pertaining to constants for systematic correction for film shrinkage, atmospheric distortion, etc., via input terminal 10 and the input signals from the handwheels and footwheels, and then a series of correctional signals are produced at the output terminals of the computer. Correctional signals $x+(\Delta x)$ (22) and $y+(\Delta y)$(22) are transmitted to the X and Y servomotors (not shown in FIG. 1) that accurately position the first photocarriage 22; related correctional signals $x+(\Delta x)$ (24) and $y+(\Delta y)$ (24) are transmitted to the X and Y servomotors that accurately position the second photocarriage 24. Correctional signals, multiplied by a scale factor of $n$, are also transmitted to the stylus (not shown) on tracing table 16 to drive same.

Figure 2:
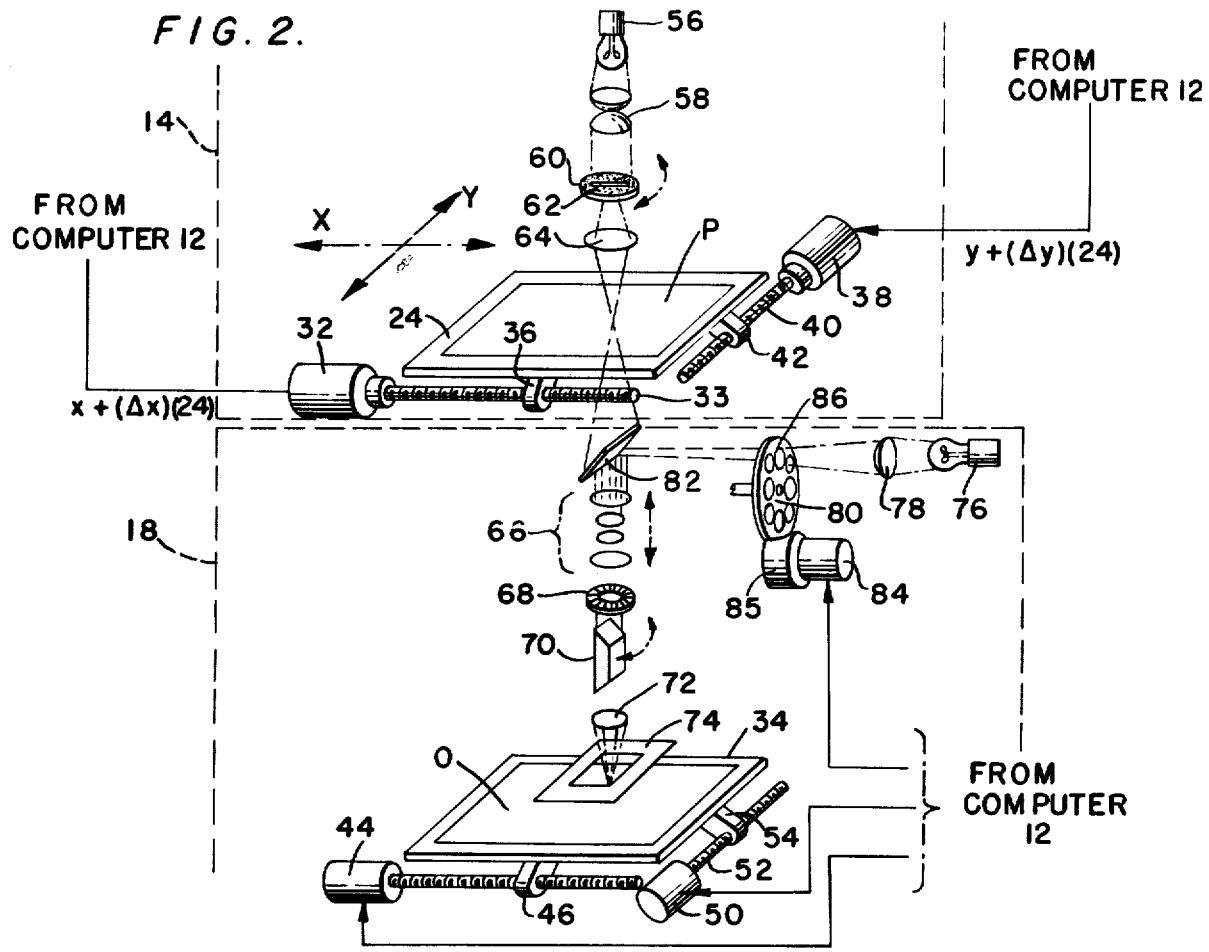
FIG. 2 is a schematic view of the optical transmission train of the orthophotographic printer for transforming an aerial photograph into an orthophotograph, and the preferred embodiment of the novel apparatus constructed in accordance with the principles of this invention for annotating the orthophotograph produced on the sensitized recording film.

Orthophotographic printer 18 includes a first photocarrier 34 that is movable in the X and Y axis; such photocarrier is operatively associated with stereocomparator 14 via an optical transmission train (not shown in FIG. 1 but visible in FIG. 2). Computer 12, after proper programming, issues commands that control the operation of the optical transmission train. After an orthophotograph is produced by orthoprinter 18, the orthophotograph is removed to annotating station 20 so that a draftsman can manually add the graphic symbols and alphanumeric data necessary for the orthophotograph to function as an annotated map. Stencils, grid overlays, and other drafting tools may be utilized by the draftsman. Obviously, the manual operations performed at station 20 constitute off-line procedures that substantially increase the costs of producing the annotated orthophotograph and sorely limit the speed at which such maps can be produced. The structural and functional relationships described so far with reference to FIG. 1 are conventional and are embodied in the "OP/C" optical orthophotographic printing system that is commercially available from Ottico Meccanica Italiana of Rome, Italy, also known as O.M.I., the assignee of the present application.

Before discussing the components of the optical transmission train of FIG. 2, it is desirable at this juncture to briefly re-examine the theory underpinning the operation of the orthophotographic printer 18. All orthophotographic printers, whether analogue, electronic, or optical in nature, as in the instant case, operate on the premise that the input positioned photocarriage 22 is an aerial photograph P with inherent distortions. The photograph is scanned and divided into elemental image bundles. Such image bundles are transformed into an orthogonal frame of reference and then re-projected by a projection system onto a sensitized recording film in proper register to correct for the original distortions.

FIG. 2 schematically shows the optical transmission train, or so-called transfer optics, which produces an orthophotograph O from the aerial photograph P, with its inherent distortions, that is positioned on the second photocarriage 24 of the stereocomparator 14. The photocarriage 24 is moved in the X plane by a servomotor 32 that accurately positions photocarriage 24 through a threaded shaft 33 that engages an ear 36 on the photocarriage 24. The servomotor 32 responds to the signal $(x)+(\Delta x)$ (24) supplied by computer 12. THe photocarriage is moved in the Y plane by a servomotor 38 that accurately positions the photocarriage 24 through a threaded shaft 40 that engages ear 42 on the photocarriage. The servomotor 38 responds to the signal $y+(\Delta y)$ (24) supplied by computer 12.

The aerial photograph P is transformed into an orthophotograph O on photocarriage 34 of orthoprinter 18 by utilization of the optical transmission train shown in FIG. 2. The photocarriage 34 remains spaced at a fixed distance from photocarriage 24, and parallel thereto, at all times. Photocarriage 34, upon which the photographically sensitized recording film is placed can be adjusted in the X direction by servomotor 44, lead screw 46 and ear 48 on photocarriage 34; similarly, the photocarriage can be adjusted in the Y direction by servomotor 50, lead screw 52 and ear 54 on photocarriage 34. The photocarriage 34 may be adjusted either manually or upon receiving appropriate command signals from computer 12.

The optical transmission train includes a projection light source 56, a condenser 58 for collimating the light rays emanating from the light source, an opaque lens 60 with a narrow scanning slot 62 and a collector lens 64, all of these components being situated above the photocarriage 24 and the aerial photograph P positioned thereon. The remaining components of the optical transmission train are disposed between photocarriages 24 and 34 and comprise a zoom lens assembly 66, an exposure control shutter 68, a Dove or Amici prism 70, a collecting lens 72, and an exposure mask 74 with a narrow slit to permit the selected image to be focused on the photographically sensitive member retained on photocarriage 34. The mask 74 is fixed, and the photocarriages are movable relative thereto. Lens 60 with slot 62 and prism 70 are rotatable about the central vertical axis passing therethrough to rotate the image projected upon the medium retained upon photocarriage 34, as indicated by the two-headed directional arrows of FIG. 2. Zoom lens assembly 66 is adjustable to vary the magnification of the image being projected through exposure mask 74. The commands for operating the lens 60, the prism 70 and the zoom lens 66, are all supplied by computer 12; similarly, the selection of the areas of photograph P to be scanned and the rate of the scanning may be controlled by computer 12.

Figure 3:
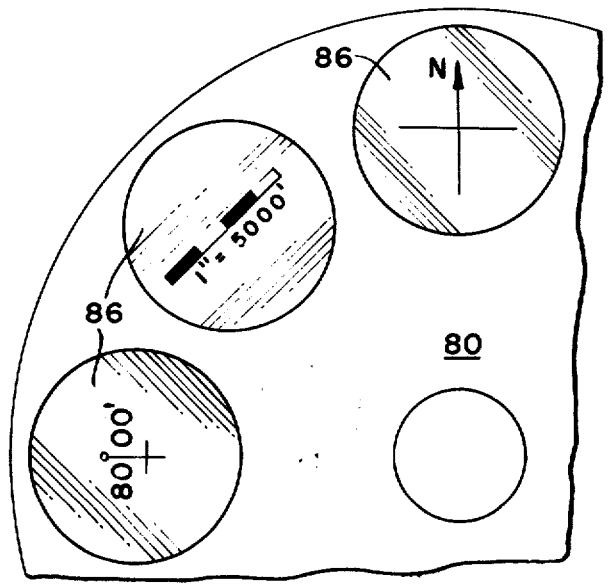
FIG. 3 is a fragmentary view, on an enlarged scale, of the turret employed within the novel apparatus of FIG. 2.

The unique apparatus for optically annotating each portion of the orthophotograph O at the moment that it is projected onto the sensitized recording film is shown in FIG. 2. Such apparatus is an add-on feature that is compatible with, and takes full advantage of, the desirable characteristics of the known optical transmission train described above. The unique apparatus comprises a projection lamp 76, a condensing lens 78, a turret 80, and a semi-reflecting mirror 82. A stepping motor 84 and gearing 85 advances or indexes the turret 80, which, as shown in FIG. 3, has a series of transparencies removably mounted about its periphery. The stepping motor 84 and gearing 85 may be manually operated, as by a switch, or may respond to appropriate commands from computer 12.

A semi-reflecting or half-silvered mirror 82 is positioned between the underside of photocarriage 24 and zoom lens assembly 66 within the optical transmission train; the mirror is positioned at an acute angle to the vertical axis of the transmission train. Because of its inherent properties, the mirror does not refract and/or distort the image projected downwardly from selected areas of aerial photograph P, but permits the image to pass freely therethrough into zoom lens assembly 66. However, when the image from a transparency 86 on turret 80 illuminated by lamp 76 and focused by lens 78 strikes mirror 82, it reflects all of the light rays downwardly into zoom lens assembly 66. Thus, it will be appreciated, mirror 82 may transmit both images simultaneously downwardly through the optical transmission train to pass through exposure mask 74 as a single combined image, that forms an integral portion of an annotated orthophotograph. The operation of mirror 82 and the optical transmission train parallels the manner in which a reflexaction lens system operates in a camera.

With mirror 82 retained in its tilted position in FIG. 2, the rays of light from lamp 76 pass through lens 78 and then through a selected one of transparencies 86 retained within turret 80. The image from the selected transparency strikes mirror 82 and is reflected downwardly at right angles through zoom lens assembly 66, exposure control shutter 68, prism 70, collecting lens 72 and the slit in exposure mask 74 onto the sensitized photographic film, or orthoprint O, retained on photocarriage 34. The turret 80 holding the set of transparencies 86 is advanced or indexed by stepping motor 84 and gearing 85 in response to commands delivered from computer 12, or alternatively, by operation of a manual switch.

FIG. 3 shows the details of three representative transparencies of the plurality of transparencies 86 that are projected onto the recording film at the same moment as the image of the selected portions of the aerial photograph to produce a fully annotated map. Proceeding in a counterclockwise fashion, the first transparency provides the N-S orientation for the map, the second transparency provides the relative scale for the map, and the third transparency provides a latitude reading and a related grid tick for the map. Additional transparencies may provide graphic indications for other grid ticks, highway intersection, railroads, points of interest, etc.

Figure 4:
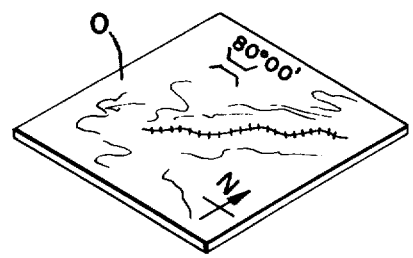
FIG. 4 is a perspective view of an orthophotograph with the annotations added thereto by the apparatus shown in FIGS. 2 and 3.

FIG. 4 shows an orthophotograph O after it has been fully annotated by simultaneous exposure to the various transparencies retained in turret 80 and to the selected areas of aerial photograph P; the resulting orthophotograph O has now been transformed into an accurately colored map of higher resolution and far greater precision than that obtainable via conventional procedures.

Figure 5:
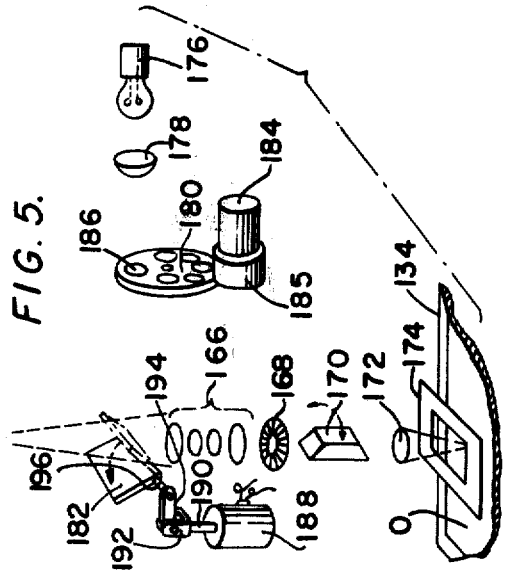
FIG. 5 is a schematic view of an alternative embodiment of the novel apparatus for annotating the orthophotograph produced on the sensitized recording film.

FIG. 5 shows an alterantive embodiment of the novel apparatus for annotating the orthophotograph O produced on the sensitized recording film. Since the alterantive embodiment utilizes most of the same elements of the optical transmission train of the orthophotographic printer already described in conjunction with the preferred embodiment of FIGS. 2–4, corresponding elements are identified by the same reference numeral preceded by the prefix of "100". Thus, to illustrate, light source 76 in the preferred embodiment corresponds to light source 176 in the alternative embodiment, turret 80 in the preferred embodiment corresponds to turret 180 in the alternative embodiment, etc.

Whereas the mirror 82 of the preferred embodiment is a semi-reflecting or half-silvered mirror that enables the image of the selected portion of the aerial photograph P to be projected therethrough onto the sensitized recording film simultaneously with the image reflected therefrom by the illumination of the selected transparency 86 in the turret 80, mirror 182 and the hardware operatively associated therewith is designed for exposing the sensitized recording film in a two step sequence.

The upper or back half of mirror 182 is fully silvered, and such mirror is normally held out of the optical path of the image projected downwardly from photocarriage 24, as indicated by the solid outline in FIG. 5. Thus, the image from the selected portion of photograph P is projected through the optical transmission train 166, 168, 170, 172 and 174 onto the orthophotograph O being generated on photocarriage 134. Subsequently, in accordance with a control command from computer 12, the solenoid 188 is energized, drawing armature 190 and clevis 192 downwardly toward the housing for the solenoids. A link 194 is secured at one end to clevis 192, and a pin 196 extends from the opposite end of the link. Consequently, as the link 194 is shifted by its connection to the clevis 192, the pin 196 flips or pivots the mirror 182 about a hinge on its lower edge (not shown) into the optical path for the optical transmission train, as indicated by the dotted outline in FIG. 5. Since the mirror is fully silvered on its upper or back surface, the image being projected downwardly from photograph P is now blocked, and the image from selected transparency 186 in turret 180 is reflected downwardly from the face of mirror 182 onto the orthophotograph O being generated. After the exposure of the selected image is completed, solenoid 188 is de-energized and mirror 182 is returned to its normal position out of the path of the image projected through the optical transmission train of the orthophotographic printer. Obviously, while solenoid 188 and pin 194 may be so arranged as to positively pivot mirror 182 between its two positions relative to the optical transmission train, the mirror may be biased toward a home position by a spring (not shown) secured thereto, and pin 194 may only be employed to pivot the mirror in one direction against the urging of the spring.

It will become readily apparent that numerous modifications, changes, and alterations in the annotating apparatus will become readily apparent to the skilled artisan as he peruses the specification and drawings set forth supra. For example, the photocarriage 34 may assume the form of a film drum with the recording film wrapped about its periphery; such drum could be indexed in the X and Y position past the fixed exposure mask. Additionally, fiber optic bundles could be utilized within the optical transmission train in lieu of condensing lens to effectively collimate the rays of light projected from light sources 56 and 76, and the apparatus for annotation could also be utilized in an off-line mode. Hence, it is submitted that the appended claims be broadly construed in a manner commensurate with the advance in the useful arts and sciences described in the foregoing specification.

I claim:

1. An orthophotographic printer for producing annotated orthophotographs comprising, in combination:
   a. a first photocarriage for supporting an aerial photograph with inherent distortions therein,
   b. means for translating said first photocarriage in a first and a second plane,
   c. a second photocarriage for supporting sensitized recording film,
   d. means for translating said second photocarriage in a first and a second plane, said planes being spaced from, but parallel to, the planes within which said first photocarriage is translated,
   e. an optical transmission train for optically rectifying the inherent distortions in the aerial photograph while projecting images from said photograph onto the recording film, said optical transmission train including:
      1. a first light source and a first lens with a narrow scanning slit positioned above the aerial photograph to illuminate selected portions thereof and thus project images therefrom through said first photocarriage and toward said sensitized recording film, and
      2. an exposure mask with a narrow slit positioned above said sensitized recording film to allow the projected images to expose only selected areas of te sensitized recording film as the first and second photocarriages are translated relative to one another,
   f. means for optically annotating the orthophotograph as same is produced on the recording film by successive exposures, said means comprising:
      1. projection means disposed in operative relationship to said optical transmission train,
      2. a series of transparencies with distinct cartographic images retained within said projection means,
      3. a second light source and a second lens positioned in alignment with said projection means for illuminating said transparencies and projecting the cartographic images from said transparencies toward said optical transmission train, and
      4. mirror means positioned within said optical transmission train at an acute angle to the images illuminated by said first and second light sources and projected by said first and second lenses, and
      5. said mirror means reflecting the images of the transparencies illuminated by said second light source onto said exposure mask positioned above said sensitized recordng film while permitting the image of the selected portion of the aerial photograph illuminated by said first light source to fall onto said exposure mask.

2. An orthophotographic printer as defined in claim 1 wherein said mirror means is a semi-reflecting mirror which permits the projected images from the aerial photograph supported on said first photocarriage to pass freely therethrough while simultaneously reflecting the images of the transparencies onto said exposure mask positioned above said sensitized recording film.

3. An orthophotographic printer as defined in claim 1 wherein said mirror means is a fully reflecting mirror, said mirror normally being retained out of said optical transmission train, and means for shifting said mirror onto the path of said optical transmission train to block the image projected from the aerial photograph supported on said first photocarriage from being projected onto said exposure mask positioned above sensitized recording film.

* * * * *